United States Patent [19]

Ocvirk

[11] Patent Number: 5,152,589
[45] Date of Patent: Oct. 6, 1992

[54] BRAKE SLIP-CONTROLLED HYDRAULIC BRAKE SYSTEM, ESPECIALLY FOR USE WITH AUTOMOTIVE VEHICLES

[75] Inventor: Norbert Ocvirk, Offenbach, Fed. Rep. of Germany

[73] Assignee: Alfred Teves GmbH, Frankfurt am Main, Fed. Rep. of Germany

[21] Appl. No.: 678,496

[22] Filed: Apr. 1, 1991

[30] Foreign Application Priority Data

Apr. 4, 1990 [DE] Fed. Rep. of Germany ...... 4010841

[51] Int. Cl.$^5$ .............................................. B60T 8/48
[52] U.S. Cl. ...................... 303/116 SP; 303/DIG. 1; 303/DIG. 5
[58] Field of Search ........................ 303/84.1, 84.2, 87, 303/113 R, 116 R, 116 SP, 117, DIG. 1, DIG. 2, DIG. 5

[56] References Cited

U.S. PATENT DOCUMENTS

| 3,731,980 | 5/1973 | Fink et al. | 303/DIG. 5 |
| 4,618,189 | 10/1986 | Nakanishi et al. | 303/115 PP |
| 5,039,176 | 8/1991 | Hellmann et al. | 303/116 R X |

FOREIGN PATENT DOCUMENTS

| 303261 | 2/1989 | European Pat. Off. | 303/116 R |
| 3827367 | 2/1990 | Fed. Rep. of Germany | 303/113 R |
| 2644417 | 9/1990 | France | 303/113 R |
| 154456 | 6/1988 | Japan | 303/DIG. 2 |
| 2214250 | 8/1989 | United Kingdom | 303/116 SP |
| 9105689 | 5/1991 | World Int. Prop. O. | 303/116 SP |

Primary Examiner—Robert J. Oberleitner
Assistant Examiner—Alfred Muratori
Attorney, Agent, or Firm—Robert P. Seitter; J. Gordon Lewis

[57] ABSTRACT

An anti-locking, hydraulic brake system is described comprising a master cylinder (4), a pressure fluid collector, at least one wheel brake (5) which, through a master pressure conduit (7), is in communication with the master cylinder (4) and, through a return conduit (12), is in communication with an auxiliary pressure pump (8), an electromagnetically actuated outlet valve (13) in the return conduit (12), and a hydraulically controlled inlet valve (6) in the master pressure conduit (7). The pump is connected to the wheel brake by an auxiliary pressure conduit having a throttle restriction therein. A control conduit branching from the auxiliary pressure conduit upstream from the throttle restriction operates the inlet valve. A diaphragm valve (3) allows either unrestricted or restricted communication of the master cylinder with the master cylinder pressure conduit, the diaphragm valve hydraulically re-switchable by a differential pressure exerted through a first control conduit (1) and a second control conduit (2) provided between the inlet valve (6) in the master pressure conduit (7) and the master cylinder (4).

4 Claims, 1 Drawing Sheet

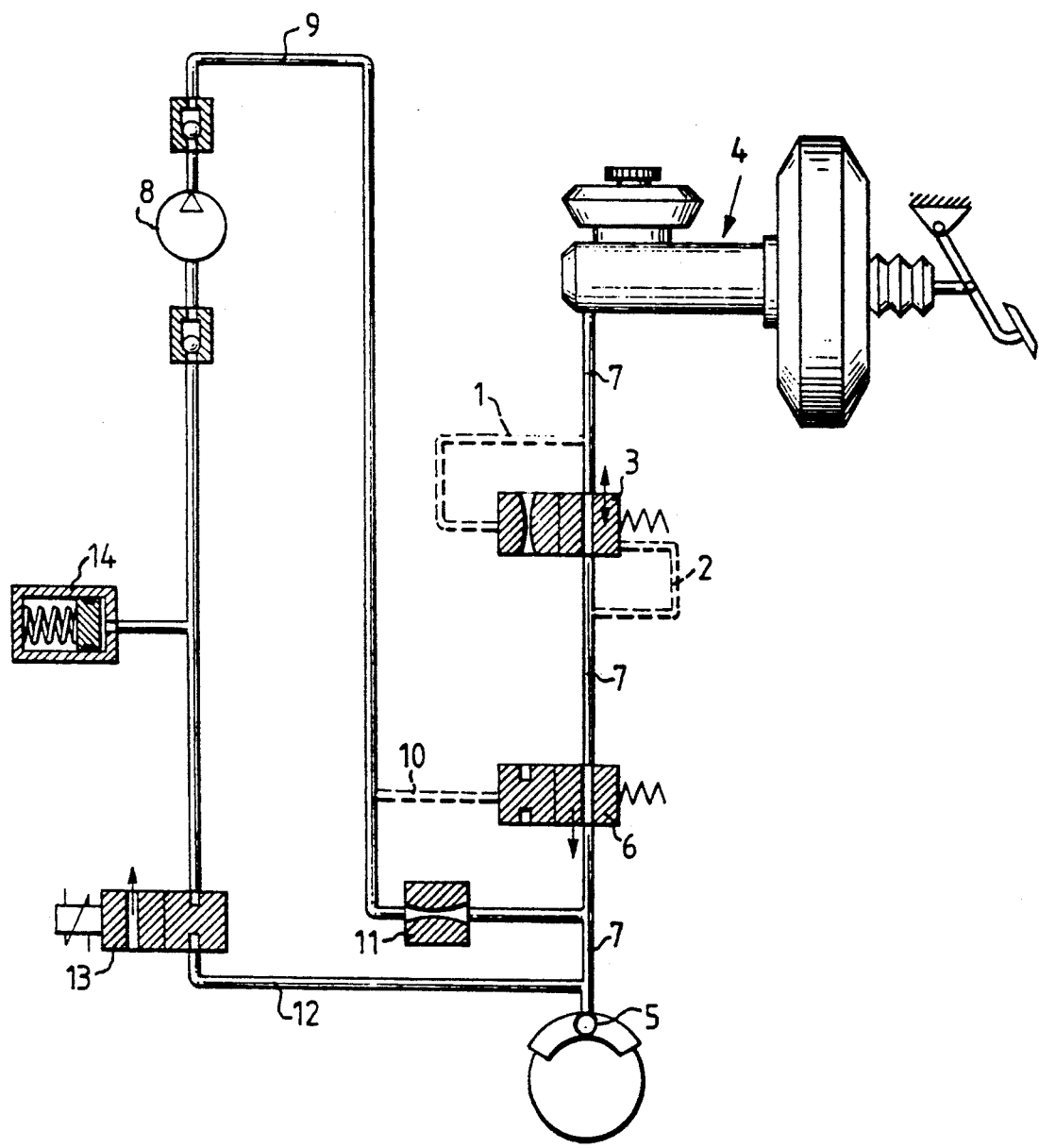

5,152,589

BRAKE SLIP-CONTROLLED HYDRAULIC BRAKE SYSTEM, ESPECIALLY FOR USE WITH AUTOMOTIVE VEHICLES

INTRODUCTION

The present invention is concerned with a brake slip-controlled hydraulic brake system, especially for use with an automotive vehicle. Such systems typically employ an inlet valve and outlet valve associated with each wheel brake and an auxiliary pressure pump, controlled with an electronic control responsive to wheel sensor signals. In some systems, the inlet valve is hydraulically closed by the pump pressure.

BACKGROUND OF THE INVENTION

The brake systems of this type, during the pressure decrease phase, in the wheel brake, tends as a result of the required pump pressure build-up time, with the inlet valve not yet closed and the outlet valve already opened, to lower the brake pedal position, as pressure fluid volume can escape from the master cylinder, through the two valves switched into the open position, into a low pressure reservoir before the pump working pressure built up after a time delay moves the hydraulically re-switchable inlet valve into the switch-over closed position thereof, throttling the main pressure conduit. This tendency of a pedal drop during the anti-locking control, in individual cases, subjectively, might cause an unpleasant pedal sensation, constituting, moreover, a reduction in the available maximum pedal stroke. Moreover, the suggested circuit configuration of the anti-locking control system is operable only in conjunction with a specifically adapted master cylinder, so that the valve circuit cannot be used with a conventional tandem master cylinder. Consequently, a subsequent modification of a conventional brake system to enable use thereof with an anti-locking control system is precluded.

BRIEF DESCRIPTION OF THE INVENTION

It is, therefore, the object of the invention to improve the brake system of the afore-described type to the effect that a simplified hydraulic circuit is provided permitting proper operation in conjunction with a conventional master cylinder, at the same time avoiding the afore-mentioned disadvantages and providing enhanced operating comfort and involving less manufacturing efforts.

The invention permits enhanced operating comfort, at the same time ensuring an adequate residual brake volume responsive to the pedal travel should the auxiliary pressure system be inactive.

Moreover, it proves to be particularly advantageous to effect the hydraulic excitation of the diaphragm valve, through two control pressure conduits switching in opposite directions and first exhibiting a pressure equilibrium, with the first of said control conduits measuring the pressure in the master pressure conduit between the master cylinder and the diaphragm valve, while the second of said control conduits transmits the prevailing hydraulic pressure in the master pressure conduit between the wheel brake-sided inlet valve and the diaphragm valve so that in response to the differential pressure introduced by the outlet valve, before and behind the diaphragm valve, a re-switch into the diaphragm position takes place.

To insure a simple yet reliable switch positioning of the inlet valve, the auxiliary pressure pump, through a control conduit branching from the auxiliary pressure conduit, directly acts on the inlet valve, with a throttle being coupled to the auxiliary pressure conduit behind the control conduit to enable the required excitation pressure of the inlet valve to be adjusted.

Storage of the excess flow volume available during opening of the outlet valve in a pressure fluid reservoir contributing, if need be, to a rapid pressure fluid supply to the auxiliary pressure pump, has proved advantageous.

Due to the connection of the auxiliary pressure conduit in the direct vicinity of the wheel brake, a direct effect on the master cylinder is precluded in an advantageous manner.

BRIEF DESCRIPTION OF THE DRAWINGS

The Figure is a hydraulic circuit diagram of a hydraulic brake slip controlled system according to the present invention.

DETAILED DESCRIPTION OF THE INVENTION

The pressure fluid supply to the wheel brake 5 is through the master pressure conduit 7 connected to a conventional master cylinder 4, with the diaphragm valve 3 switched, in the basic position, to non-impeded passage. The inlet valve 6 is connected in series therewith and normally opened in the basic position, and being integrated into the master pressure conduit 7, thereby normally ensures an almost unthrottled hydraulic communication with the wheel brake 5. The inlet valve 6 is hydraulically operated to be closed by the pump pressure acting in control conduit 10. The return conduit 12 is branched between the inlet valve 6 and the wheel brake 5, with the return conduit 12 accommodating an electromagnetic outlet valve 13 normally closed, in the basic position, in a de-energized condition. In the remaining segment of the return conduit 12, a pressure fluid accumulator 14 acting as a low pressure accumulator is located between the outlet valve 13 and an auxiliary pressure pump 8, which accumulator 14 is provided to receive the excess volume flow coming from the wheel brake 5 during a pressure decrease. The return conduit 12 terminates on the intake side of an auxiliary pressure pump 8. On the pump pressure side, is connected an auxiliary pressure conduit 9 which, for the purpose of the auxiliary pressure feed into the master pressure conduit 7, is connected between the inlet valve 6 and the wheel brake 5. For hydraulically actuating the inlet valve 6, the control conduit 10 branches from the auxiliary pressure conduit 9. A throttle 11 is provided between the afore-described branch of control conduit 10 and the connection on the master pressure conduit 7 in the auxiliary pressure conduit 9. The throttle 11 adjusts the required reswitch pressure on the inlet valve 6. Both the inlet and the outlet pressure in the master pressure conduit 7 act on the diaphragm valve 3, for the purpose of the hydraulic reswitch, through respective control pressure conduits 1, 2, both in communication with the diaphragm valve 3.

WAY OF OPERATION

In the disclosed embodiment as shown in the Figure the valves are in the normal position so that, in the slip-free braking operation, pressure fluid can be fed in known and conventional manner from the master cylinder 4, through the opened diaphragm valve 3 and the inlet valve 6 disposed in the master pressure conduit 7, to the wheel brake 5 in proportion to the pedal force as long as the outlet valve 13 remains in its normally closed or deenergized condition. Both the pressure fluid accumulator 14 coupled to the outlet valve 13 and the auxiliary pressure pump 8 coupled thereto, are initially inactive so that it is only through the throttle 11 provided in the auxiliary pressure conduit 9 that a reduced pressure can have an effect on the blocking valve of the auxiliary pump pressure 8. As a result of the pressure-equalized effect in the first and second control conduits 1, 2 the diaphragm valve 3, in spring-supported manner, remains in the open switch position.

For the purpose of the brake slip control and, hence, for the initiation of the pressure decrease phase on the over-decelerated wheel, first, the outlet valve 13, electromagnetically, is switched to the open position so that the pressure decrease out flow volume directed from a wheel brake 5 into the return conduit 12 results in the changing of the pressure fluid accumulator 14. The control pressures in the first and second control conduits 1, 2 of the diaphragm valve 3, through the effect of the pressure drop in the master pressure conduit 7 no longer are equalized, thereby effecting a switch-over of the diaphragm valve 3 into the throttling position thus precluding a sudden drop of the brake pedal. As the effect of the auxiliary pressure in the control conduit 10 of the inlet valve 6 is delayed by the changing of the pressure fluid accumulator 14 and by the start-up of the auxiliary pressure pump 8, the inlet valve 6 switches into the closing position only after a delay, so that a continued pressure increase in proportion to the pedal force, during the controlled brake slip phase, is precluded. The pressure modulation in the sense of a pressure maintaining phase required in the continued brake slip control, and the realization of different pressure increase and pressure decrease rates, are reproducible by the cooperation between throttle 11 in the auxiliary pressure conduit 9 and the phase actuation of the outlet valve 13 according to the control algorithm of the electronic system in reasonable approximation to the prior known electronic control philosophy both of inlet and outlet valves.

Due to the hydraulic logical circuit combination between the auxiliary pressure conduit 9 and the master pressure conduit 7 and the valve configuration according to the invention, a brake system exhibiting a reduced number of components and provided with a brake slip control has been provided that permits an unlimited operation in connection with a conventional, unmodified master brake cylinder. At the same time, the diaphragm valve hydraulically coupled ahead of the inlet valve 6 precludes any unacceptable pedal travel loss to improve the operating sensation and to insure an adequate residual brake volume in the event of a failure of the auxiliary pressure system.

I claim:

1. An anti-locking hydraulic brake system for an automotive vehicle, comprising: a master cylinder; at least one wheel brake, a master cylinder pressure conduit communicating said wheel brake with said master cylinder; a pressure fluid collector; a return conduit in communication with said wheel brake and said pressure fluid collector; an electromagnetically actuated outlet valve in said return conduit, said outlet valve in a resting position blocking said return conduit, and, in an actuated switching position, opening said return conduit; a hydraulically controlled inlet valve in said master pressure conduit; an auxiliary pressure pump having an intake taking in pressure fluid from said pressure fluid collector and having an outlet; an auxiliary pressure conduit feeding pressure fluid from said auxiliary pressure pump outlet directly to said wheel brake whenever said auxiliary pressure pump is operated; a control conduit branching from said auxiliary pressure conduit to said inlet valve to operate said inlet valve; a throttle restriction in said auxiliary pressure conduit downstream from said control conduit branching; said pump outlet constantly connected to said wheel brake whenever said auxiliary pressure pump is operated to pressurize said outlet, said throttle restriction the only element in said auxiliary pressure conduit affecting outflow from said pump outlet to said wheel brake; a diaphragm valve in said master cylinder pressure conduit upstream from said inlet valve, hydraulically shiftable from a first condition allowing substantially unrestricted flow from said master cylinder to a second condition allowing only restricted flow from said master cylinder by means responsive to a predetermined pressure difference thereacross in said master cylinder pressure conduit.

2. A brake system according to claim 1, wherein said means responsive to a predetermine pressure difference includes a first control conduit connected to said diaphragm valve and said master pressure conduit to branch off between said master cylinder and said diaphragm valve, and a second control conduit connected to said diaphragm valve and to said master pressure conduit between said inlet valve and said diaphragm valve.

3. A brake system according to claim 1, wherein said pressure fluid accumulator is disposed, in shunt, in said return conduit between said outlet valve and said auxiliary pressure pump.

4. A brake system according to claim 1, wherein said auxiliary pressure conduit in communication with said auxiliary pressure pump terminates in said master pressure conduit between said inlet valve and said wheel brake.

* * * * *